United States Patent
Hashimoto et al.

(10) Patent No.: US 8,040,559 B2
(45) Date of Patent: Oct. 18, 2011

(54) PRINT MANAGEMENT SYSTEM, METHOD AND COMPUTER-READABLE MEDIUM CONTAINING PROGRAM FOR THE SAME

(75) Inventors: Shunichi Hashimoto, Mihara (JP); Shuichi Takemoto, Mihara (JP); Takahide Toshito, Mihara (JP); Norifumi Tasaka, Mihara (JP); Toshiaki Kumagawa, Tokyo (JP); Minoru Nagata, Tokyo (JP); Hisakatu Ochi, Tokyo (JP)

(73) Assignees: Mitsubishi Heavy Industries Printing & Packaging Machinery, Ltd., Hiroshima (JP); NEC Engineering, Ltd., Tokyo (JP)

( * ) Notice: Subject to any disclaimer, the term of this patent is extended or adjusted under 35 U.S.C. 154(b) by 304 days.

(21) Appl. No.: 12/084,904

(22) PCT Filed: Nov. 14, 2006

(86) PCT No.: PCT/JP2006/322673
§ 371 (c)(1),
(2), (4) Date: Jul. 2, 2009

(87) PCT Pub. No.: WO2007/055384
PCT Pub. Date: May 18, 2007

(65) Prior Publication Data
US 2009/0303501 A1 Dec. 10, 2009

(30) Foreign Application Priority Data
Nov. 14, 2005 (JP) ................ 2005-329293

(51) Int. Cl.
*H04N 1/40* (2006.01)

(52) U.S. Cl. .................... 358/1.9; 358/468
(58) Field of Classification Search .......... 358/1.9, 358/2.1, 1.4, 1.13, 3.2–3.21, 3.29–3.32, 468
See application file for complete search history.

(56) References Cited

U.S. PATENT DOCUMENTS

| 4,656,505 | A | * | 4/1987 | Yamada et al. .............. 358/521 |
| 6,072,901 | A | * | 6/2000 | Balonon-Rosen et al. ... 382/167 |
| 6,320,676 | B1 | * | 11/2001 | Yoshidome .................... 358/1.9 |
| 6,615,727 | B2 | * | 9/2003 | Komori et al. ............... 101/484 |
| 7,253,918 | B2 | * | 8/2007 | Nishide et al. ............... 358/1.15 |

FOREIGN PATENT DOCUMENTS

JP 05281630 A * 10/1993
(Continued)

OTHER PUBLICATIONS

ISR for PCT/JP2006/322673 dated Dec. 26, 2006.

*Primary Examiner* — Thomas D Lee
*Assistant Examiner* — Stephen M Brinich
(74) *Attorney, Agent, or Firm* — Kanesaka Berner & Partners LLP

(57) ABSTRACT

Colors of printed materials are easily matched. Provided is a print management system used in a printing system including a plurality of printing presses and performing printing using plates respectively created for each printing press. The print management system includes a tone-curve storage unit for linking and storing identifying information of the printing presses and tone curves for the printing presses; a communication device for obtaining binary image data from a host system; a binary-image-data correction unit for creating binary image data for each of the printing presses by correcting the binary image data using the tone curves stored in the tone-curve storage unit; and CTPs for creating respective plates for each of the printing presses on the basis of the corrected binary image data.

13 Claims, 8 Drawing Sheets

FOREIGN PATENT DOCUMENTS

| | | |
|---|---|---|
| JP | 2001301124 A | 10/2001 |
| JP | 2002223347 A | 8/2002 |
| JP | 2003103758 A | 4/2003 |
| JP | 2004351929 A | 12/2004 |
| JP | 2005012475 A | 1/2005 |
| JP | 2005153289 A | 6/2005 |

* cited by examiner

PRINT MANAGEMENT SYSTEM, METHOD AND COMPUTER-READABLE MEDIUM CONTAINING PROGRAM FOR THE SAME

RELATED APPLICATIONS

The present application is based on International Application Number PCT/JP2006/322673 filed Nov. 14, 2006, and claims priority from, Japanese Application Number 2005329293, filed Nov. 14, 2005, the disclosures of which are hereby incorporated by reference herein in their entirety.

TECHNICAL FIELD

The present invention relates to a print management system for color matching of printed matter and, more particularly, relates to a print management system suitable for use in newspaper printing.

BACKGROUND ART

When publishing newspapers covering a wide geographic region, for example, national newspapers, images and so forth for each page are edited at the newspaper's head office, and then the results of the editing work are supplied in the form of multivalued image data. This multivalued image data is subjected to RIP processing (Raster Image Processing) at the newspaper head office to form binary image data, and this binary image data is transmitted to each newspaper printing factory. In the system used, for example, in the case of color pages, binary image data (dot data or bitmapped page image information) for each of the colors CMYB (cyan, magenta, yellow, and black) is transmitted from the newspaper company to each newspaper printing factory located in each region.

At each newspaper printing factory which receives the binary image data, in a print management system, operations are performed for inputting corresponding page indexes (codes etc. related to the version name, page, and color) and information about the newspaper press to be used etc. into the binary image data for each page, as well as for applying inspection marks and cut-off marks to the binary image data for each page.

When binary image data for each page is completed in this way, platemaking is performed on the basis of the respective binary image data. Platemaking is performed by, for example, CTP (Computer to Plate) equipment or CTF (Computer to Film) equipment. The plates created in this way are manually mounted on the plate cylinders of corresponding newspaper presses by an operator, and then printing is carried out on each newspaper press.

In this kind of newspaper printing, it is known that there are inevitably differences in the color and so on of the printed matter due to the various types of printing materials (printing paper, ink, etc.), individual differences among newspaper presses, and so forth. Thus, to match the colors of the printed matter between newspaper presses, color management has been proposed in the related art (for example, see Patent Document 1).

For example, the color management disclosed in Patent Document 1 is carried out by the following procedure.

First, the newspaper company transmits multivalued image data instead of binary image data. Each newspaper printing factory holds color management information for each newspaper press installed in the factory, and the multivalued image data is color corrected using this color management information. Accordingly, multivalued image data reflecting the characteristics of each newspaper press is created for each newspaper press. Then, the color-corrected multivalued image data is converted to binary image data by RIP processing, and printing is performed on the basis of this binary image data.

Patent Document 1: Japanese Unexamined Patent Application, Publication No. 2004-351929.

DISCLOSURE OF INVENTION

However, with the conventional color management described above, it is necessary to transmit multivalued image data from the newspaper company to each newspaper printing factory; therefore, it is necessary to substantially change the conventional newspaper workflow, in which binary image data is distributed from the newspaper company.

Moreover, because color correction is performed on multivalued image data, it is necessary to convert from multivalued image data to binary image data each time color correction is performed, resulting in the problem of complex processing.

An object of the present invention is to provide a print management apparatus and a print management method which can easily match colors of printed matter.

A first aspect of the present invention is a print management system used in a printing system including a plurality of printing presses and performing printing using plates respectively created for each printing press, the print management system comprising: a storage unit for linking and storing identifying information of the printing presses and color management information created on the basis of color characteristics of the printing presses; a data obtaining unit for obtaining binary image data from a host system; a correction unit for creating binary image data for each of the printing presses by correcting the binary image data using the color management information stored in the storage unit; and a platesetter for creating respective plates for each of the printing presses on the basis of the corrected binary image data.

With this configuration, the binary image data sent from the host system is corrected by the correction unit using the color management created on the basis of the color characteristic of each printing press. By means of this correction, the binary image data reflecting the color characteristics of each printing press is sent to the platesetter, where plates corresponding thereto are created. The created plates are mounted to the corresponding printing presses, and printing is performed. Thus, because printing is performed using plates that reflect the color characteristics of each printing press, it is possible to match the colors of printed pages printed by each printing press. Also, with the print management system described above, because color correction is performed on the binary image data itself, a procedure for converting multivalued image data to binary image data each time color correction is performed can be eliminated, which allows color correction to be performed extremely easily.

The print management system described above is suitable for use particularly in newspaper printing; by applying this print management system to newspaper printing, it is possible to transmit binary image data from a host system in the newspaper company etc., as in conventional systems. Therefore, it is possible to directly integrate it into existing workflow patterns.

In the print management system described above, the color management information may be created for each printing material used in each printing press and is stored in the storage unit; and the correction unit may correct the binary image data using the color management information specified by the printing material to be used in printing.

Accordingly, by changing the color management information used for correction according to the printing material to be used in printing, it is possible to create binary image data that reflects even color differences due to the printing materials. Thus, it is possible to match the colors of the printed pages even more, thus improving the quality of the printed pages.

The print management system described above may further include a measurement unit for respectively measuring color characteristics of a page printed by each printing press; a computing unit for calculating information needed to create the color management information on the basis of the color characteristics for each printing press measured by the measurement unit; and an information creating unit for creating the color management information for each printing press on the basis of calculation results of the computing unit.

With the above configuration, color characteristics of the printed pages are created by the measurement unit provided for each printing press, information needed for creating color management information is calculated by the computing unit on the basis of these color characteristics, and the color management information is created by the information creating unit using these calculation results. Thus, because a configuration for creating color management information is provided, by periodically creating color management information, it is possible to periodically update the color management information stored in the storage unit. By doing so, it is possible to constantly correct the binary image data using new color management information. Even when a new printing press is installed or new printing materials and so forth are introduced, it is possible to easily create color management information for that printing press or those printing materials.

In the print management system described above, the computing unit may include a first calculating unit for determining a dot-gain characteristic for each printing press from each color characteristic for each printing press; and a second calculating unit for determining a difference characteristic for each printing press by comparing the dot-gain characteristic for each printing press with a reference dot-gain characteristic serving as a reference for correction of color reproducibility.

With this configuration, the dot-gain characteristic for each printing press is created by the first calculating unit from each color characteristic of the printing presses, and a difference characteristic between this dot-gain characteristic and a reference dot-gain characteristic is created by the second calculating unit. Then, by transferring this difference characteristic to the information creating unit described above as computational results of the computing unit, color management information is created for each printing press on the basis of that difference characteristic.

In this case, because the color management information is created on the basis of the difference characteristic between the reference dot-gain characteristic and the dot-gain characteristic of each printing press, by correcting the binary image data using this color management information, it is possible to make the colors of the printed pages printed by each printing press match colors according to the reference dot gain. Accordingly, it is possible to easily achieve color matching of printed pages.

With one of the plurality of printing presses provided in this printing system serving as a reference printing press, the reference dot-gain characteristic described above may be a dot-gain characteristic of the printed page printed by this reference printing press. In addition, an ideal dot-gain characteristic may be created in advance by data processing or the like, and this dot-gain characteristic may be used as the reference dot-gain characteristic.

A second aspect of the present invention is a printing system comprising a plurality of printing presses and at least one print management system, wherein the print management system includes a storage unit for linking and storing identifying information of the printing presses and color management information created on the basis of color characteristics of the printing presses; a data obtaining unit for obtaining binary image data from a host system; a correction unit for creating binary image data for each of the printing presses by correcting the binary image data using the color management information stored in the storage unit; and a platesetter for creating respective plates for each of the printing presses on the basis of the corrected binary image data, wherein each printing press performs printing using the plate corresponding to that printing press.

With this configuration, the binary image data sent from the host system is received by the data obtaining unit and transferred to the correction unit. This binary image data is corrected by the correction unit using the color management information created on the basis of the color characteristic of each printing press.

By means of this correction, the binary image data reflecting the color characteristic of each printing press is sent to the platesetter, where plates corresponding thereto are created. The created plates are mounted to the corresponding printing presses, and printing is performed. Thus, because printing is performed using the plates reflecting the color characteristics of each printing press, it is possible to match the colors of the printed pages printed by each printing press. In this case, with the print management system described above, because color correction is performed on the binary image data itself, a procedure for converting the multivalued image data to binary image data each time color correction is performed can be eliminated, which makes it possible to easily perform color correction.

Moreover, because binary image data should be obtained from a host system at the newspaper company or the like, as with conventional systems, it is possible to easily integrate it into existing systems without changing the conventional workflow.

The printing system described above may further include a measurement unit for respectively measuring color characteristics of a page printed by each printing press; a computing unit for calculating information needed to create the color management information on the basis of the color characteristics for each printing press measured by the measurement unit; and an information creating unit for creating the color management information for each printing press on the basis of calculation results of the computing unit.

The printing system described above may further include a host system including an editing apparatus for creating an image in the form of multivalued image data, a conversion unit for converting the multivalued image data created in the editing apparatus into binary image data, and a communication unit for transmitting the binary image data to the print management apparatus, wherein the data obtaining unit of the print management system includes a receiving unit for receiving the binary image data transmitted from the communication unit provided in the host system.

A third aspect of the present invention is a print management method including a correction step of creating, using color management information created for each of a plurality of printing presses, binary image data for each of the printing presses by correcting respective binary image data obtained from a host system; a platemaking step of creating plates on the basis of the corrected binary image data; and a printing step of performing printing with the plates mounted to the corresponding printing presses.

With the method described above, the binary data sent from the host system is corrected using the color management created on the basis of the color characteristic of each printing press. By passing the corrected binary image data to the plate step, plates corresponding thereto are created. The created plates are mounted to the corresponding printing presses, and printing is performed.

Thus, because printing is performed using plates that reflect the color characteristics of each printing press, it is possible to match the colors of printed pages printed by each printing press. In this case, because color correction is performed on the binary image data itself, a procedure for converting multivalued image data to binary image data each time color correction is performed can be eliminated, which allows color correction to be performed extremely easily.

Because binary image data should be obtained from a host system at the newspaper company or the like, as with conventional systems, it is possible to directly integrate it into existing workflows, without changing the conventional workflows.

In the print management method described above, the color management information may be created for each printing material that can be used in each printing press, and the correction step may correct the binary image data using the color management information specified by the printing material to be used in printing.

The print management method described above may further include a color-characteristic creating step of creating a color characteristic of a printed page printed by each printing press; a first calculating step of determining a dot-gain characteristic for each printing press from each color characteristic for each printing press; a second calculating step of determining a difference characteristic for each printing press by comparing the dot-gain characteristic for each printing press with a reference dot-gain characteristic; and an information creating step of creating the color management information for each printing press on the basis of the difference characteristic created for each printing press.

A fourth aspect of the present invention is a print management program used in a printing system including a plurality of printing presses and performing printing using plates created for the printing presses, the print management program causing a computer to execute correction processing for creating, using color management information created for each of the plurality of printing presses, binary image data for each of the printing presses by correcting respective binary image data obtained from a host system; platemaking processing for creating plates on the basis of the corrected binary image data; and processing for outputting the plates.

By implementing information processing according to the above-described program using hardware resource, it is possible to create binary image data that reflects the color characteristics of each printing press, and by performing platemaking using this binary image data, it is possible to create plates that reflect the color characteristics of each printing press. Then, by performing printing on each printing press using these plates, it is possible to match the colors of the printed pages printed by each printing press. In this case, because color correction is performed on the binary image data itself, a process for converting multivalued image data to binary image data each time color correction is performed becomes unnecessary, which makes it possible to reduce the processing load for color correction.

In the print management program described above the color management information may be created for each printing material that can be used in each printing press, and the correction processing may correct the binary image data using the color management information specified by the printing material to be used in printing.

The print management program described above may further include first calculation processing for determining a dot-gain characteristic for each printing press from a color characteristic of a printed page printed by each printing press; second calculation processing for determining a difference characteristic for each printing press by comparing the dot-gain characteristic for each printing press with a reference dot-gain characteristic; and information creation processing for creating the color management information for each printing press on the basis of the difference characteristic created for each printing press.

The present invention affords an advantage in that it is possible to easily match colors of printed matter.

EXPLANATION OF REFERENCE SIGNS

1 PRINTING SYSTEM
2 HOST SYSTEM
3a to 3c PRINT MANAGEMENT SYSTEMS
4a to 4i PRINTING PRESSES
5 PRINT MANAGEMENT APPARATUS
6a to 6c DENSITY MEASURING DEVICES
7 COMPUTING DEVICE
21 EDITING SYSTEM
22 RIP
23 COMMUNICATION DEVICE
31 COMMUNICATION DEVICE
32 BINARY-IMAGE-DATA CORRECTION UNIT
33a to 33c CTPs
34 TONE-CURVE STORAGE UNIT

35 TONE-CURVE EXTRACTION UNIT
36 TONE-CURVE CREATING UNIT

BEST MODE FOR CARRYING OUT THE INVENTION

An embodiment of a printing system according to the present invention will be described below with reference to the drawings.

Figure 1:
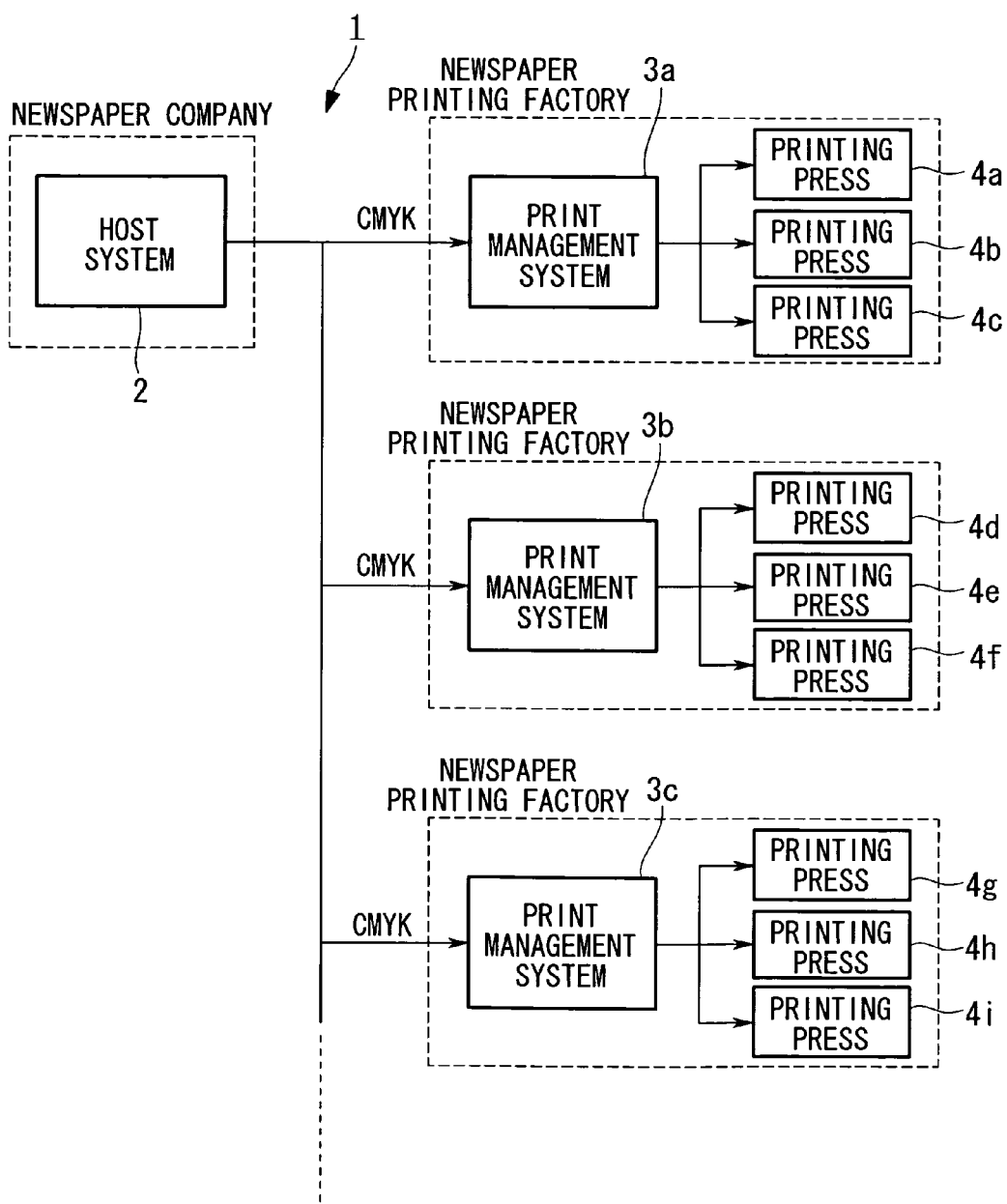
FIG. 1 is a diagram showing, in outline, the overall configuration of a printing system according to an embodiment of the present invention.

As shown in FIG. 1, a printing system 1 according to this embodiment includes a host system 2 installed in the head office of a newspaper company; print management systems (including CTP (Computer To Plate) systems, for example) 3a to 3c located in respective newspaper printing factories dotted around the country (hereinafter, when referring to all print management systems, they are assigned the single reference sign "3", and when referring to each individual print management system, they are assigned reference signs "3a", "3b", etc.); and a plurality of printing presses 4a to 4i (hereinafter, when referring to all printing presses, they are assigned the single reference sign "4", and when referring to each individual printing press, they are assigned reference signs "4a", "4b", etc.). These printing presses 4 are, for example, offset rotary presses for newspapers. FIG. 1 shows an example in which each newspaper printing factory is provided with three printing presses 4; however, the number of printing presses 4 provided in each newspaper printing factory is not particularly limited.

The host system 2 and the print management systems 3a to 3c both include communication devices (not shown in the drawing) and are configured so as to be capable of mutually sending and receiving information via these communication devices. In other words, they are configured so as to enable data transmission and reception between the host system 2 and the print management systems 3a to 3c and data transmission and reception among the print management systems 3.

Figure 2:
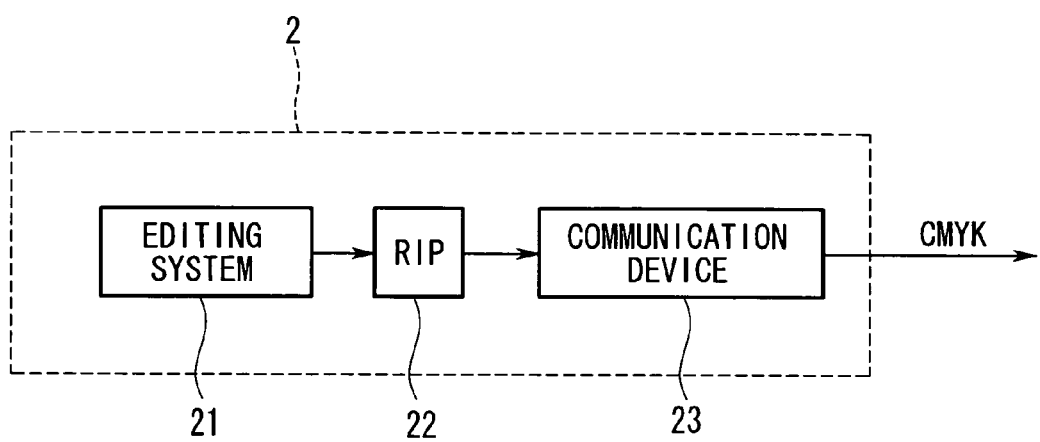
FIG. 2 is a block diagram showing, in outline, the configuration of a host system according to an embodiment of the present invention.

As shown in FIG. 2, the host system 2 is formed of an editing system (editing apparatus) 21, an RIP (conversion unit) 22, and a communication device (communication unit) 23. The editing system 21, which is a system for performing newspaper editing operations, creates newspaper pages in the form of multivalued image data under the control of an operator. The RIP 22 is a known device for converting the multi-valued image data into binary image data. The communication device 23 is connected with the communication device (not shown in the drawing) provided in each print management system 3 shown in FIG. 1 via an information transmission medium (for example, the Internet, Ethernet (registered trademark), and so on), to realize transmission and reception of information.

Figure 3:
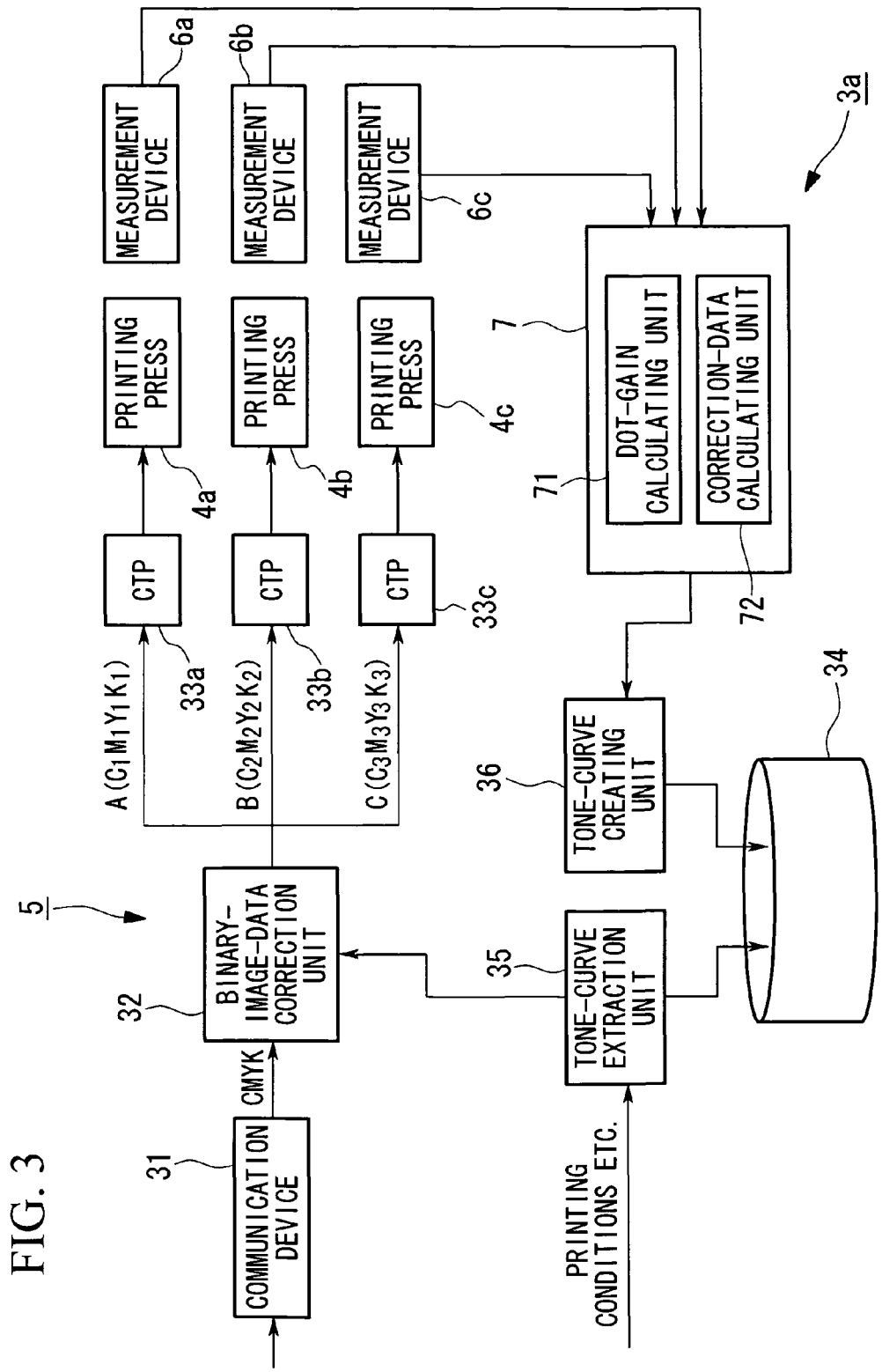
FIG. 3 is a block diagram showing, in outline, a print management system according to an embodiment of the present invention.

The print management systems 3, on the other hand, have the configuration shown in FIG. 3. Because each print management system 3a to 3c has the same configuration, the configuration of the print management system 3a will be described here as an example.

The print management system 3a includes a print management apparatus 5, density measuring devices (measurement units) 6a to 6c provided for the corresponding printing presses 4a to 4c (hereinafter, when referring to all of the density measuring devices, they will be assigned the single reference sign "6", and when referring to each individual density measuring device, they will be assigned the reference signs "6a", "6b", "6c", etc.), and a computing device (computing unit) 7 for performing computations related to tone curves on the basis of information from the density measuring devices 6.

The print management apparatus 5 includes a communication device (data obtaining unit) 31, a binary-image-data correction unit (correction unit) 32, CTPs (platesetters) 33a to 33c provided for the corresponding printing presses 4 (hereinafter, when referring to all CTPs, they will be assigned the single reference sign "33", and when referring to each individual CTP, they will be assigned reference signs "33a", "33b", and "33c"), a tone-curve storage unit (storage unit) 34, a tone-curve extraction unit 35, and a tone-curve creating unit (information creating unit) 36.

The communication device 31, which is connected to the communication device 23 provided in the host system 2 described above (see FIG. 2) via the information transmission medium, performs transmission and reception of information; it receives the binary image data transmitted from the host system 2 and outputs it to the binary-image-data correction unit 32.

The binary-image-data correction unit 32 creates binary image data for each of the printing presses 4a, 4b, and 4c by correcting the binary image data from the communication device 21 using tone curves provided by the tone-curve extraction unit 35, which will be described later, and outputs the corrected binary image data to the CTPs 33a, 33b, and 33c provided for the respective printing presses 4a, 4b, and 4c. Each CTP 33 creates a plate from the tone-curve corrected binary image data received from the binary-image-data correction unit 32.

The plates created by the CTPs 33a, 33b, and 33c are mounted to the corresponding printing presses 4a, 4b, and 4c by the operator, and printing is carried out at each printing press.

Figure 4:
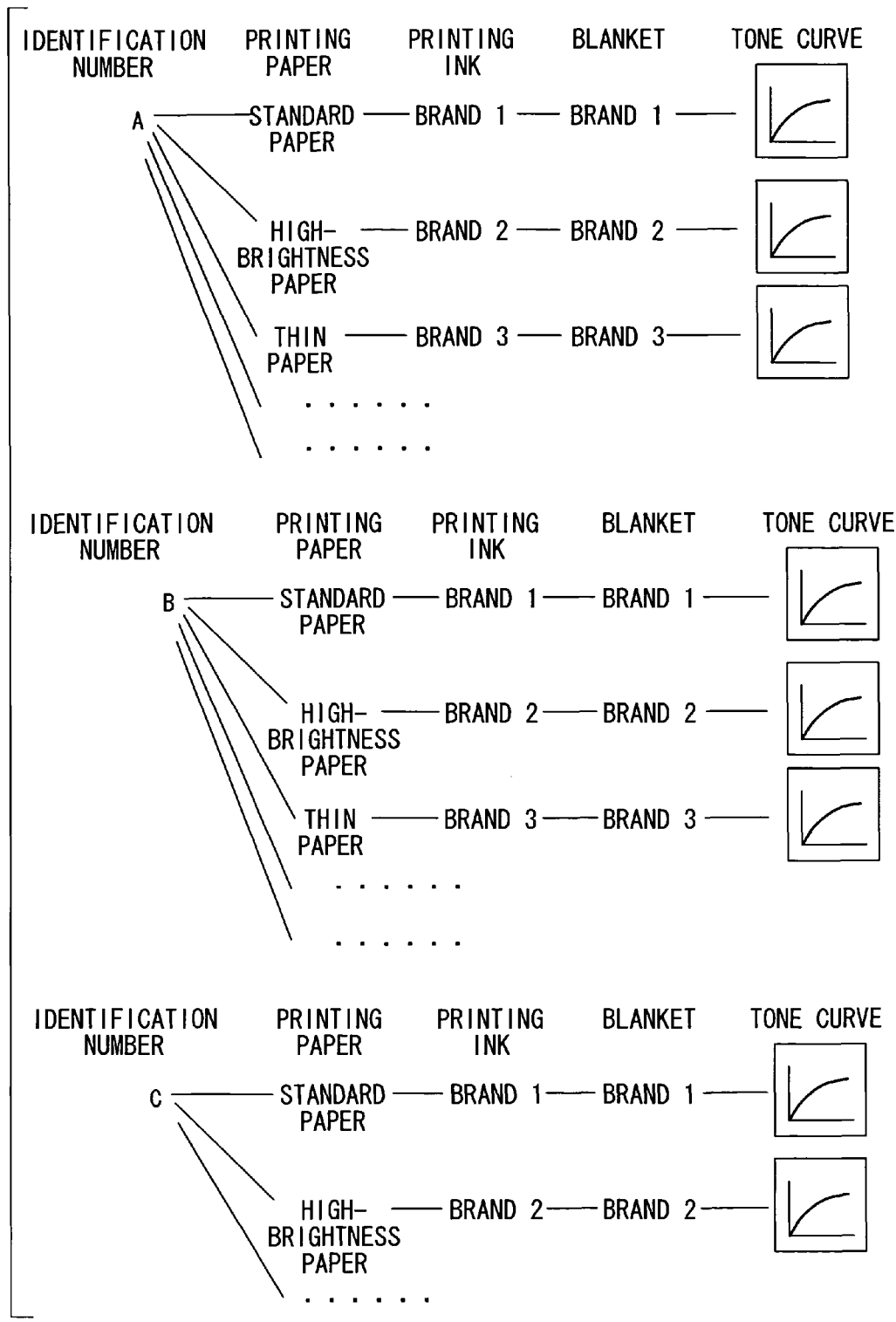
FIG. 4 is a diagram showing tone curves stored in a tone-curve storage unit.

As shown in FIG. 4, the tone-curve storage unit 34 links and stores intrinsic identifying information A, B, and C assigned to each printing press 4a to 4c, respectively, with tone curves (color management information) that reflect the color characteristics of each printing press. A plurality of these tone curves is created for each combination of printing materials, including the printing paper, printing ink, blanket, and so on.

A reference tone curve used in tone-curve creation processing (described later) and binary image data for tone-curve creation are stored in the tone-curve storage unit 34.

The tone-curve extraction unit 35 obtains printing conditions input by the operator via an input device provided externally to the print management system 3a (including various conditions used when printing the binary image data received from the host system 2, for example, an ID number of the printing press to execute printing and information about the printing materials to be used in printing, such as the printing paper, printing ink, dampening solution, blanket, and so forth); extracts a tone curve matching the obtained printing conditions from the tone-curve storage unit 24; and outputs it to the binary-image-data correction unit 32.

The tone-curve creating unit 36 receives correction data (to be described later) from the computing device 7 and creates a tone curve for each printing press 4 on the basis of this correction data. The tone-curve creating unit 36 periodically performs tone-curve creation (described later) and updates the tone curves stored in the tone-curve storage unit 34 to the latest ones. Accordingly, it is possible to periodically reflect the printing status of each printing press 4 in the tone curves stored in the tone-curve storage unit 34.

The density measuring devices 6a to 6c described above are, for example, line-sensor IRGB density measuring devices disposed in the printing presses 4a to 4c. These density measuring devices 6 are measurement devices for measuring the colors in images on the printing paper as I (infrared), R (red), green (G), and blue (B) reflection densities (mixed-color screen densities) in the form of a line extending in the print width direction; they can measure the reflection density of the entire printing paper, or they can measure the reflection density at an arbitrary position. For example, when employing an offset rotary press for duplex newspaper printing as the printing presses 4a to 4c according to this embodiment, the density measuring devices 6a to 6c are disposed at both the front and rear sides so as to sandwich the printing paper transport path and measure the reflection densities of both the front and rear surfaces. The reflection densities, in other words, the mixed-color screen densities, measured by each of the density measuring devices 6a to 6c are transferred to the computing device 7 as color characteristics.

The computing device 7 is a device for calculating correction data for creating the tone curve for each printing press on the basis of the color characteristics from the density measuring devices 6; it includes, for example, a dot-gain calculating unit (first calculating unit) 71 and a correction-data calculating unit (second calculating unit) 72.

Tone Curve Creation

In the print management system 3 having such a configuration, the tone curve creation described above is performed in accordance with the following procedure. This tone curve creation is performed before actual image printing.

Figure 5:
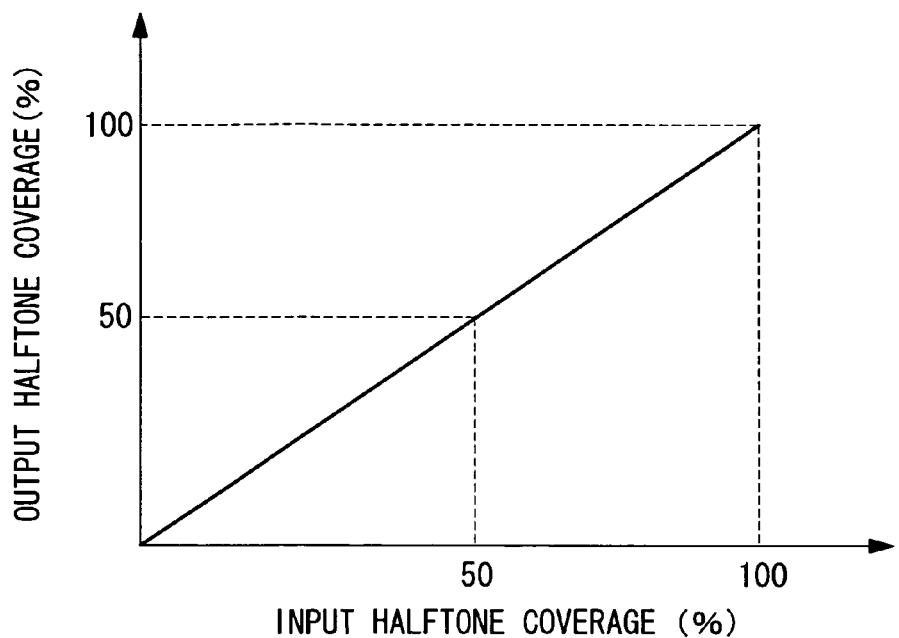
FIG. 5 is a diagram showing an example of a reference tone curve according to an embodiment of the present invention.
Figure 6:
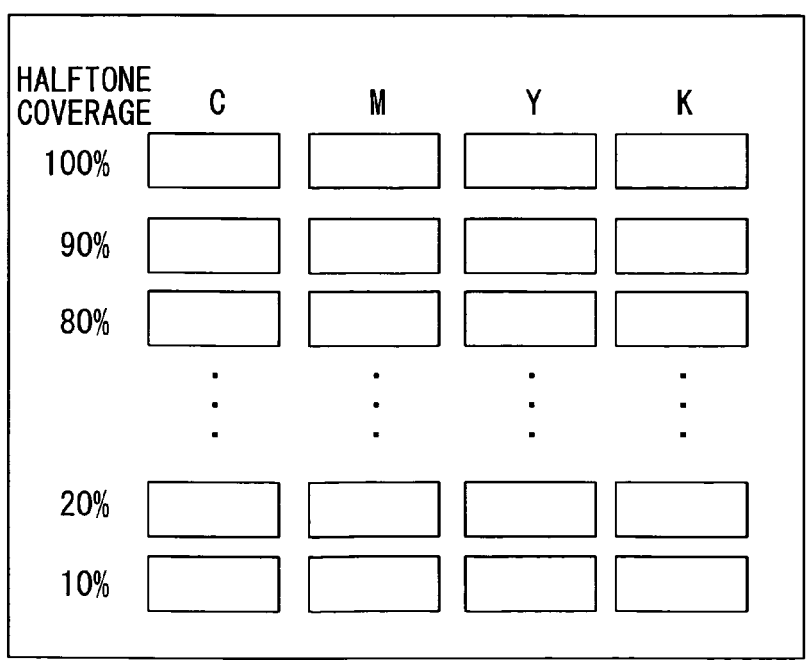
FIG. 6 is a diagram showing an example of an image based on binary image data for tone-curve creation according to an embodiment of the present invention.

First, the reference tone curve and the binary image data for tone curve creation, stored in the tone curve storage unit 34, are extracted by the tone-curve extraction unit 35 and are output to the binary-image-data correction unit 32. The binary-image-data correction unit 32 corrects the binary image data received from the tone-curve extraction unit 35 using the reference tone curve and outputs it to each CTP. FIG. 5 shows an example of the reference tone curve, and FIG. 6 shows an example image based on the binary image data for tone curve creation. In FIG. 5, the horizontal axis is the input halftone coverage, and the vertical axis is the output halftone coverage; the tone curve is a line of proportionality in this example, but it is not limited thereto and may be any type of curve. Regarding the binary image data for tone curve creation, shown in FIG. 6, the image in question is formed by varying the halftone coverage for each of the colors C (cyan), M (magenta), Y (yellow), and K (black) from 10% to 100% in 10% increments.

Each CTP 33 creates a plate on the basis of the corrected binary image data supplied from the binary-image-data correction unit 32 and outputs the plate. The plates which are output are mounted to each of the printing presses 4a to 4c by the operator, and a trial print run for tone curve creation is conducted.

For the print pages printed by the printing presses 4a to 4c, the densities of the printed surfaces are measured by the respective density measuring devices 6. The color characteristics obtained as the measurement results of the density measuring devices 6 are linked with the identifying information of each printing press and are output to the dot-gain calculating unit 71 in the computing device 7.

Figure 7:
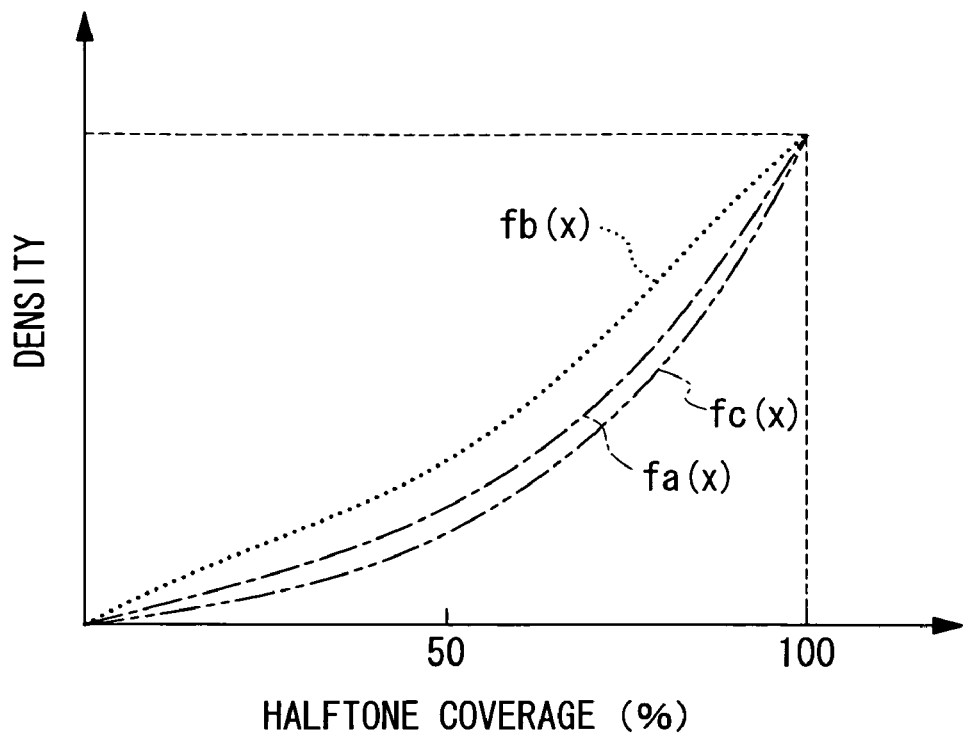
FIG. 7 is a diagram showing examples of color characteristics according to an embodiment of the present invention.
Figure 8:
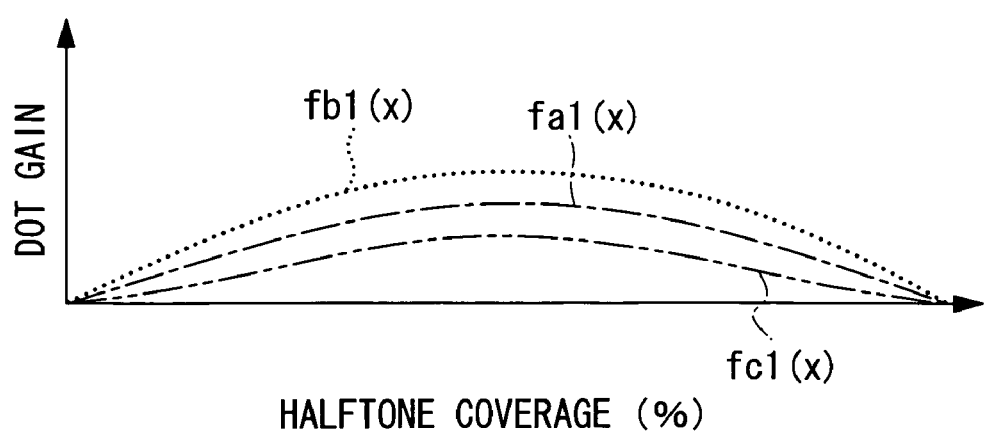
FIG. 8 is a diagram showing examples of dot-gain characteristic obtained on the basis of FIG. 7.

The dot-gain calculating unit 71 in the computing device 7 determines the dot gain on the basis of the received color characteristics. FIG. 7 shows examples of color characteristics. In FIG. 7, the horizontal axis is the halftone coverage, and the vertical axis is the density. FIG. 7 shows that, for example, the color characteristic of the printing press 4a is defined as curve fa(x), the color characteristic of the printing press 3b is defined as curve fb(x), and the color characteristic of the printing press 3c is defined as curve fc(x). FIG. 8 shows dot-gain characteristics calculated on the basis of the color characteristic of each printing press shown in FIG. 7. In FIG. 8, the horizontal axis is the halftone coverage, the vertical axis is the dot gain, curve fa1(x) is the dot-gain characteristic of the printing press 4a, curve fb1(x) is the dot-gain characteristic of the printing press 4b, and curve fc1(x) is the dot-gain characteristic of the printing press 4c.

Once the dot-gain characteristics are obtained in this way, these dot-gain characteristics are linked with the identifying information of each printing press and are output to the correction-data calculating unit 72.

The correction-data calculating unit 72 creates the correction data by determining a differential characteristic between the dot-gain characteristic of each printing press and a reference dot-gain characteristic serving as a reference.

The reference dot-gain characteristic is set, for example, by defining one of the plurality of printing presses 4a to 4i provided in the printing system 1 as a reference printing press; the dot gain characteristic of this reference printing press can be used as the reference dot-gain characteristic.

For example, when the printing press 4a among the printing presses 4a to 4i provided in the printing system 1 is set as the reference printing press, the dot-gain characteristic fa1(x) shown in FIG. 8 is used as the reference dot-gain. Because this reference dot-gain characteristic is to be commonly used in the tone-curve creation in the other print management systems 3b and 3c shown in FIG. 1, the print management system 3a transmits this reference dot-gain characteristic to the other print management systems 3b and 3c via the communication device 31. The transmission processing may be performed in parallel with the relevant tone-curve creation, or it may be performed after the processing for the relevant tone-curve creation is completed.

Regarding the reference dot-gain characteristic described above, instead of using one of the dot-gain characteristics for the printing presses 4a to 4i, it is also possible to create an ideal dot-gain characteristic by data processing and to use this dot-gain characteristic as the reference dot-gain characteristic. In this case, because each of the print management systems 3a to 3c always possess the reference dot-gain characteristic, an advantage is afforded in that the above-described transmission processing for the reference dot-gain characteristic is unnecessary.

Figure 9:
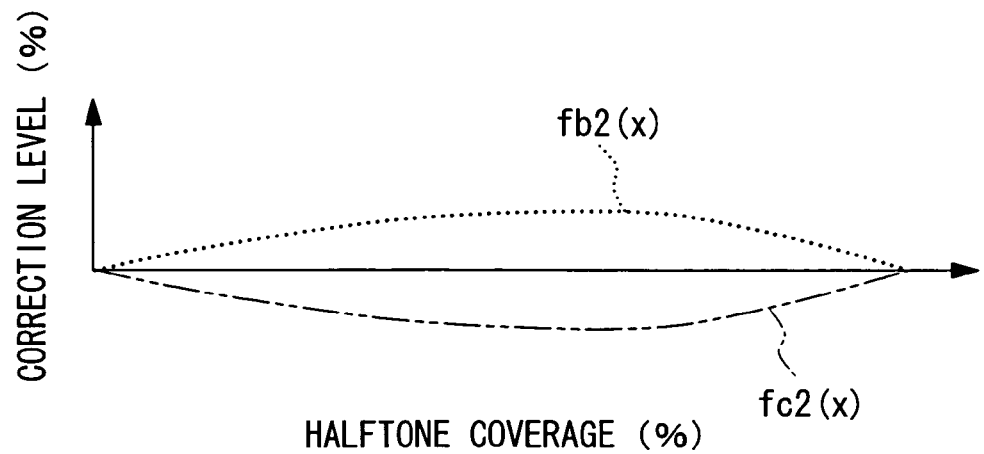
FIG. 9 is a diagram showing examples of data-correction characteristics obtained on the basis of FIG. 8.

When the correction-data creating unit 72 obtains the correction-data characteristic by, as described above, determining the difference between the dot-gain characteristic for each printing press and the reference dot-gain characteristic (in this embodiment the dot-gain characteristic of the printing press 4a serves as the reference dot characteristic), this correction-data characteristic is linked with the identifying information of the printing press and is output to the print management apparatus 5. Here, correction-data characteristics for each of the printing presses 4b and 4c are shown in FIG. 9 for the case where the dot-gain characteristic of the printing press 4a serves as the reference dot-gain characteristic. In FIG. 9, the horizontal axis is the halftone coverage, the vertical axis is a correction level (%), curve fb2(x) is a correction-data characteristic for the printing press 4b, and fc2(x) is a correction-data characteristic for the printing press 4c.

The correction-data characteristics fb2(x) and fc2(x) output from the correction-data creating unit 72 are input to the tone-curve creating unit 36 in the print management apparatus 5. The tone-curve creating unit 36 creates tone curves for each of the printing presses 4b and 4c by subtracting the received correction-data characteristics fb2(x) and fc2(x) from the reference tone curve shown in FIG. 5. At this time, not only simple subtraction, but also tone curve correction may be performed, such as multiplying by predetermined coefficients, multiplying by weighting values, and so on.

Also, the tone curve for the printing press 4a defined as the reference printing press serves as the reference tone curve.

Figure 10:
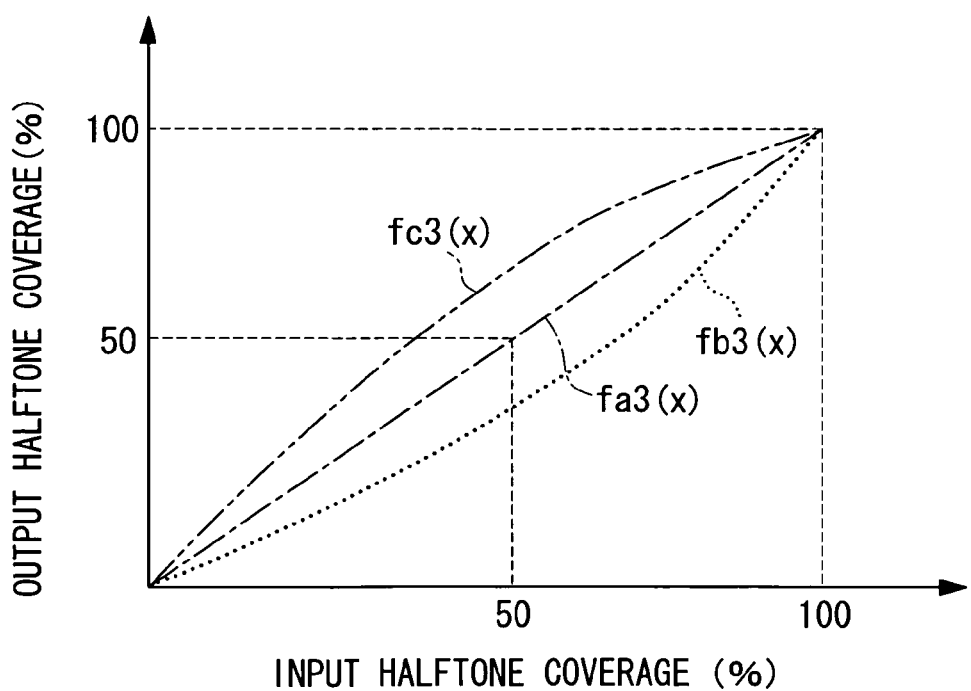
FIG. 10 is a diagram showing examples of tone curves created using the data-correction characteristics obtained on the basis of FIG. 8.

FIG. 10 shows tone curves for each of the printing presses 3a to 3c, created on the basis of the correction data characteristic shown in FIG. 9. In FIG. 10, the horizontal axis is the input halftone coverage, the vertical axis is the output halftone coverage, curve fa3(x) is a tone curve for the printing press 3a, curve fb3(x) is a tone curve for the printing press 3b, and fc3(x) is a tone curve for the printing press 3c.

Once the tone-curve creating unit 36 creates the tone curves for each of the printing presses 4a to 4c, the tone curves are linked with identifying information of the printing presses 4a to 4c and are stored in the tone-curve storage unit 34. At this time, the tone-curve creating unit 36 adds information about the printing material to be used in the present tone curve creation processing to each tone curve and stores it in the tone-curve storage unit 34.

Then, by performing the above-described tone-curve creation processing for each printing condition while changing the combination of printing materials used for printing, as shown in FIG. 4, each tone curve for each printing condition is accumulated for the identifying information for each printing press.

Then, by periodically performing the tone-curve creation processing described above, it is possible to frequently reflect the state of the printing presses 4a to 4c in each tone curve stored in the tone-curve storage unit 34.

Printing of Newspaper Pages

Next, a case where newspaper pages are printed using the printing system 1 according to this embodiment will be described.

First, as shown in FIG. 2, newspaper pages are performed by the editing system 21 of the host system 2 installed at the newspaper company. Multivalued-image data for the newspaper images created with the editing system 21 is sent to the RIP 22 and is converted from multivalued image data to binary image data. The binary image data thus created is transmitted to respective print management systems 3a to 3c installed at each newspaper printing factory shown in FIG. 1 via the communication device 23.

In each of the print management systems 3a to 3c, the binary image data is received by the communication device 31 shown in FIG. 3 and is output to the binary-image-data correction unit 32. On the other hand, the tone-curve extraction unit 35 receives printing conditions related to the present print run (identifying information of the printing presses, printing paper, printing ink, blanket, etc.) from an external input device, extracts a tone curve matching these printing conditions from the tone-curve storage unit 34, links the extracted tone curve with identifying information for the printing press, and outputs them to the binary-image-data correction unit 32.

When the tone curve is input from the tone-curve extraction unit 35, the binary-image-data correction unit 32 corrects the binary image data input from the communication device 31 using each tone curve. Doing so creates binary image data corresponding to the color characteristic of each printing press. The corrected binary image data is output to the CTPs 33a to 33c corresponding to the identifying information for the printing press linked with each tone curve.

The CTPs 33a to 33c create plates on the basis of this binary image data and output them. The output plates are mounted to the corresponding printing presses 4a to 4c by the operator, and printing is executed.

As described above, with the printing system according to this embodiment, because printing is performed using the plates reflecting the color characteristics of each of the printing presses 4a to 4i, it is possible to match the colors of the printed pages printed by each printing press. In this case, with the print management system 3 described above, because color correction is performed on the binary image data itself, a procedure for converting the multivalued image data to binary image data each time color correction is performed can be omitted, thus making it extremely easy to perform color correction.

Moreover, because the printing system 1 according to this embodiment corrects the binary image data itself, binary image data is received from the host system 2, similarly to existing workflows, which affords an advantage in that it can be directly incorporated into existing workflow patterns.

In this embodiment, a case has been described where the printing conditions are obtained from the external input device; however, when a printing schedule and so forth is set in advance, for example, it is also possible to use a configuration in which printing conditions are obtained from a print management system for managing printing schedules (not shown in the drawings).

In addition, the reference dot gain described above is not limited to the foregoing example. For example, in each of the print management systems 3a to 3c, it is possible to perform tone-curve creation using separate reference dot gains.

In this embodiment, although the computing device 7 and the print management apparatus 5 are provided as separate devices, the computing device 7 may be incorporated in the print management apparatus 5. That is, the print management apparatus 5 may be provided with the functionality realized by the computing device 7. Additionally, the tone-curve creating unit 36 provided in the print management apparatus 5 can be incorporated into the computing device 7.

The configurations of the print management apparatus 5 and the computing device 7 of this embodiment are not limited to the examples described above; they may be divided into a plurality of devices for the sake of functionality and processing convenience.

In the embodiment described above, it is assumed that the processing realized by the print management apparatus is implemented in hardware; however, it is not limited to such a configuration. For example, it is also possible to use a configuration in which all or some of that processing is carried out by separate software. In this case, the print management apparatus 5 includes a main memory such as a RAM, and a computer-readable recording medium in which a program for realizing all or some of the above processing is recorded. Then, the CPU reads out the program recorded in the recording medium and executes information processing or computational processing, thus realizing the same processing as the print management apparatus 5 described above.

The computer-readable recording medium mentioned here means a magnetic disk, a magneto-optical disk, a CD-ROM, a DVD-ROM, a semiconductor memory, and so forth. This computer program may be delivered to computers via a communication line, so that the computers, upon receiving this delivery, may execute the relevant program.

Figure 11:
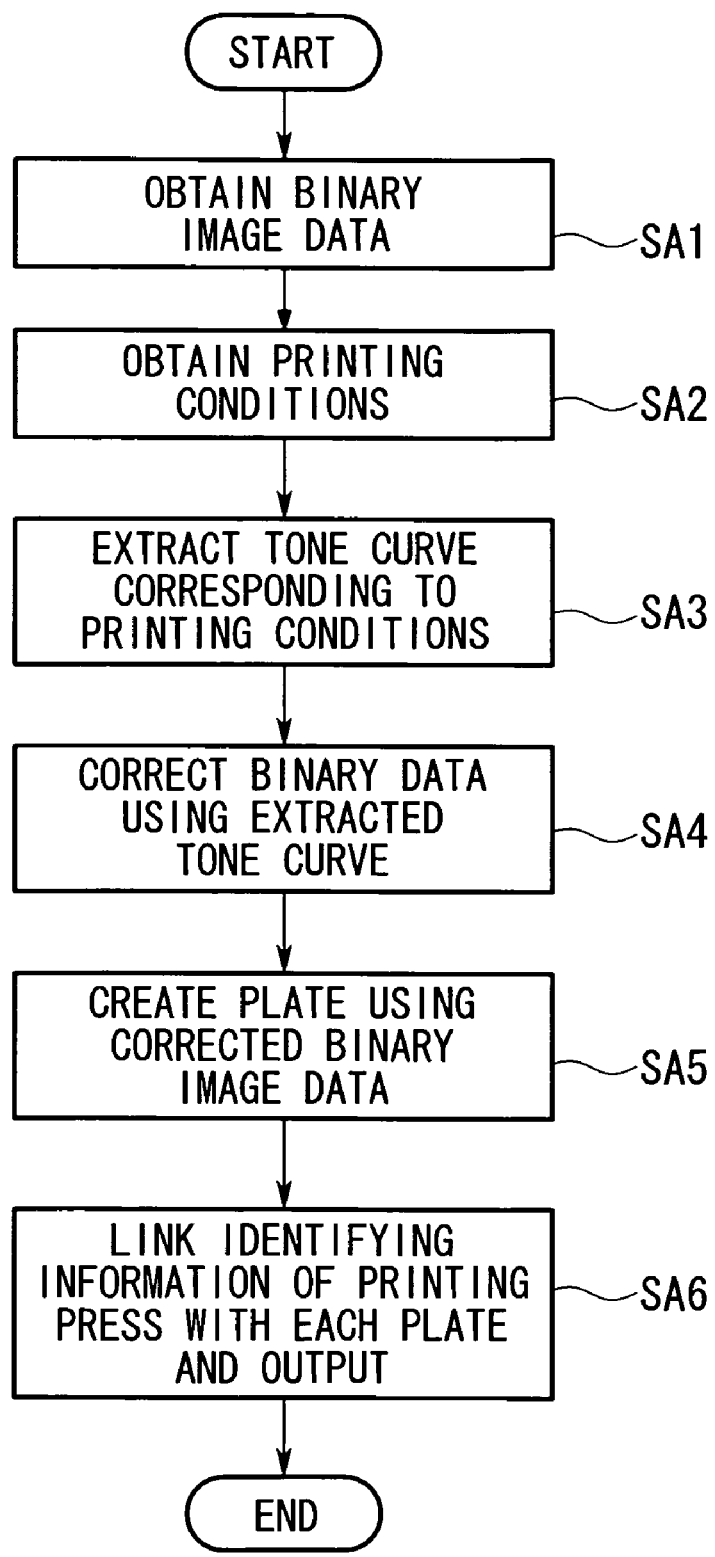
FIG. 11 is a flowchart showing a processing procedure realized by the print management system according to an embodiment of the present invention.

A processing procedure for the print management method, to be realized by the CPU executing a print management program, will be described below with reference to FIG. 11.

First, when binary image data is obtained from the host system 2 (step SA1), printing conditions corresponding to this binary image data are obtained from the external input device (step SA2), and a tone curve corresponding to the printing conditions is obtained from the tone-curve storage unit 34 (step SA3). Then, by correcting the binary image data obtained in step SA1 using this tone curve, binary image data corresponding to the printing press to be used in the present print run is created (step SA4). Plates are created on the basis of the corrected binary image data (step AS5), and the plates are linked with identifying information of each printing press and are output (step SA6). Accordingly, by mounting the output plates to the corresponding printing presses, printed matter having a uniform appearance is printed on each printing press.

Although an embodiment of the present invention have been described above with reference to the drawings, the actual configurations are not limited to this embodiment. The present invention includes various modifications so long as they do not depart from the spirit of the invention.

For example, in the embodiment above, the host system 2 is installed at the newspaper company. However, this is merely one example; the host system 2 may be installed in facilities other than the newspaper company, or it may be installed in any of the newspaper printing factories.

The invention claimed is:

1. A print management system used in a printing system including a plurality of printing presses and performing printing using plates respectively created for each printing press, the print management system comprising:
    a storage unit for linking and storing identifying information of the printing presses and color management information created on the basis of color characteristics of the printing presses;
    a data obtaining unit for obtaining binary image data from a host system;
    a correction unit for creating binary image data for each of the printing presses by correcting the obtained binary image data using the color management information stored in the storage unit; and
    a platesetter for creating respective plates for each of the printing presses on the basis of the corrected binary image data.

2. A print management system according to claim 1, wherein:
    the color management information is created for each printing material used in each printing press and is stored in the storage unit; and
    the correction unit corrects the obtained binary image data using the color management information specified by the printing material to be used in printing.

3. A print management system according to claim 1, further comprising:
    measurement units for respectively measuring color characteristics of a page printed by each printing press;
    a computing unit for calculating information needed to create the color management information on the basis of the color characteristics for each printing press measured by the measurement unit; and
    an information creating unit for creating the color management information for each printing press on the basis of calculation results of the computing unit.

4. A print management system according to claim 3, wherein the computing unit includes
    a first calculating unit for determining a dot-gain characteristic for each printing press from each color characteristic for each printing press; and
    a second calculating unit for determining a difference characteristic for each printing press by comparing the dot-gain characteristic for each printing press with a reference dot-gain characteristic serving as a reference for correction of color reproducibility.

5. A printing system comprising a plurality of printing presses and at least one print management system, wherein the print management system includes
    a storage unit for linking and storing identifying information of the printing presses and color management information created on the basis of color characteristics of the printing presses;
    a data obtaining unit for obtaining binary image data from a host system;
    a correction unit for creating binary image data for each of the printing presses by correcting the obtained binary image data using the color management information stored in the storage unit; and
    a platesetter for creating respective plates for each of the printing presses on the basis of the corrected binary image data,
    wherein each printing press performs printing using the plate corresponding to that printing press.

6. A printing system according to claim 5, further comprising:
    a measurement unit for respectively measuring color characteristics of a page printed by each printing press;
    a computing unit for calculating information needed to create the color management information on the basis of the color characteristics for each printing press measured by the measurement unit; and
    an information creating unit for creating the color management information for each printing press on the basis of calculation results of the computing unit.

7. A printing system according to claim 5, further comprising:
    said host system which includes:
        an editing apparatus for creating an image in the form of multivalued image data,
        a conversion unit for converting the multivalued image data created in the editing apparatus into the binary image data to be obtained by the data obtaining unit of the print management system, and
        a communication unit for transmitting the binary image data to the print management system,
    wherein the data obtaining unit of the print management system includes a receiving unit for receiving the binary image data transmitted from the communication unit provided in the host system.

8. A print management method performed by a print management system used in a printing system including a plurality of printing presses and performing printing using plates respectively created for each printing press, wherein the print management system includes a storage unit for linking and storing identifying information of the printing presses and color management information created on the basis of color characteristics of the printing presses, the method comprising:
    a data obtaining step of obtaining binary image data from a host system;
    a correction step of creating, using the color management information stored in the storage unit, binary image data for each of the printing presses by correcting the binary image data obtained from the host system;
    a platemaking step of creating respective plates for each of the printing presses on the basis of the corrected binary image data.

9. A print management method according to claim 8, wherein
    the color management information is created for each printing material used in each printing press and is stored in the storage unit, and
    the correction step corrects the obtained binary image data using the color management information specified by the printing material to be used in printing.

10. A print management method according to claim 8, further comprising:

a color-characteristic creating step of creating a color characteristic of a printed page printed by each printing press;

a first calculating step of determining a dot-gain characteristic for each printing press from each color characteristic for each printing press;

a second calculating step of determining a difference characteristic for each printing press by comparing the dot-gain characteristic for each printing press with a reference dot-gain characteristic; and an information creating step of creating the color management information for each printing press on the basis of the difference characteristic created for each printing press.

11. A non-transitory computer readable recording medium having recorded therein a print management program used in a printing system including a plurality of printing presses and performing printing using plates respectively created for each of the printing presses, wherein the printing system includes a storage unit for linking and storing identifying information of the plurality of printing presses and color management information created on the basis of color characteristics of the printing presses, the print management program, when executed by a computer, causing the computer to execute:

obtaining processing for obtaining binary image data from a host system;

correction processing for creating, using the color management information stored in the storage unit, binary image data for each of the printing presses by correcting the binary image data obtained from the host system;

platemaking processing for creating respective plates for each of the printing presses on the basis of the corrected binary image data.

12. A non-transitory computer readable recording medium according to claim 11, wherein the color management information is created for each printing material that can be used in each printing press and is stored in the storage unit, and the correction processing corrects the obtained binary image data using the color management information specified by the printing material to be used in printing.

13. A non-transitory computer readable recording medium according to claim 11, wherein said print management program, when executed by the computer, further causes the computer to execute:

first calculation processing for determining a dot-gain characteristic for each printing press from each color characteristic for each printing press;

second calculation processing for determining a difference characteristic for each printing press by comparing the dot-gain characteristic for each printing press with a reference dot-gain characteristic; and information creation processing for creating the color management information for each printing press on the basis of the difference characteristic created for each printing press.

* * * * *